US011820171B2

(12) United States Patent
Raya

(10) Patent No.: US 11,820,171 B2
(45) Date of Patent: Nov. 21, 2023

(54) AXLE ASSEMBLY HAVING A DRIVE PINION AND A PRELOAD NUT AND A METHOD OF ASSEMBLY

(71) Applicant: ArvinMeritor Technology, LLC, Troy, MI (US)

(72) Inventor: Dhanapal Vittala Raya, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 182 days.

(21) Appl. No.: 17/143,597

(22) Filed: Jan. 7, 2021

(65) Prior Publication Data

US 2022/0212498 A1 Jul. 7, 2022

(51) Int. Cl.
| | |
|---|---|
| *F16H 48/42* | (2012.01) |
| *F16B 21/18* | (2006.01) |
| *B60K 1/00* | (2006.01) |
| *B60K 17/16* | (2006.01) |
| *F16B 37/06* | (2006.01) |
| *F16H 57/022* | (2012.01) |
| *B60B 35/16* | (2006.01) |
| *F16H 48/08* | (2006.01) |

(52) U.S. Cl.
CPC ............ *B60B 35/16* (2013.01); *F16H 48/08* (2013.01); *F16C 2361/61* (2013.01); *F16H 2048/087* (2013.01)

(58) Field of Classification Search
CPC ....... B60B 35/16; B60B 35/18; B60B 35/125; F16H 2048/087; F16H 48/08; F16H 57/022; F16H 57/023; F16H 57/037; F16H 48/42; F16C 2361/61; B60K 17/16; B60K 20/12; F16B 37/065
See application file for complete search history.

(56) References Cited

U.S. PATENT DOCUMENTS

| | | | |
|---|---|---|---|
| 6,532,666 B1 * | 3/2003 | Denny, Jr. ............. | F16C 35/063 29/725 |
| 10,208,846 B2 | 2/2019 | Chinitz | |
| 10,316,950 B2 | 6/2019 | Chinitz et al. | |
| 11,124,054 B1 * | 9/2021 | Hadad ................... | B60K 17/08 |
| 2008/0020888 A1 * | 1/2008 | Kearney ................ | F16H 48/08 475/231 |
| 2014/0339888 A1 | 11/2014 | Downs et al. | |
| 2017/0120676 A1 * | 5/2017 | Chung ................... | B60T 1/065 |
| 2018/0126783 A1 | 5/2018 | Valente et al. | |
| 2019/0054816 A1 | 2/2019 | Garcia et al. | |
| 2019/0054817 A1 | 2/2019 | Garcia et al. | |

(Continued)

FOREIGN PATENT DOCUMENTS

| | | | |
|---|---|---|---|
| CN | 211737963 U | 10/2020 | |
| GB | 881308 A | 3/1958 | |
| WO | WO 2007061806 A2 * | 5/2007 | ............. F16C 13/00 |

OTHER PUBLICATIONS

Define drive pinion, Microsoft Bing, Mar. 24, 2023 (Year: 2023).*

(Continued)

*Primary Examiner* — Vinh Luong
(74) *Attorney, Agent, or Firm* — Brooks Kushman PC

(57) ABSTRACT

An axle assembly and method of assembly. The axle assembly may include a drive pinion and a preload nut. The drive pinion may have a recess. The preload nut may have a deformable ring. The deformable ring may engage the drive pinion inside the recess to inhibit rotation of the preload nut.

24 Claims, 8 Drawing Sheets

(56) References Cited

U.S. PATENT DOCUMENTS

| | | |
|---|---|---|
| 2019/0054818 A1 | 2/2019 | Garcia et al. |
| 2019/0113119 A1* | 4/2019 | Keeney ................ F16H 37/082 |
| 2019/0248234 A1* | 8/2019 | Funderburg ............ F16H 48/10 |
| 2020/0173494 A1 | 6/2020 | Smith et al. |
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |

OTHER PUBLICATIONS

Does a differential have a drive pinion, Microsoft Bing, Mar. 24, 2023 (Year: 2023).*
Extended European Search Report dated Jun. 7, 2022 for related European Appln. No. 22150153.9; 9 Pages.
India First Examination Report dated Aug. 8, 2022 for related India Appln. No. 202114061262; 5 Pages.

* cited by examiner

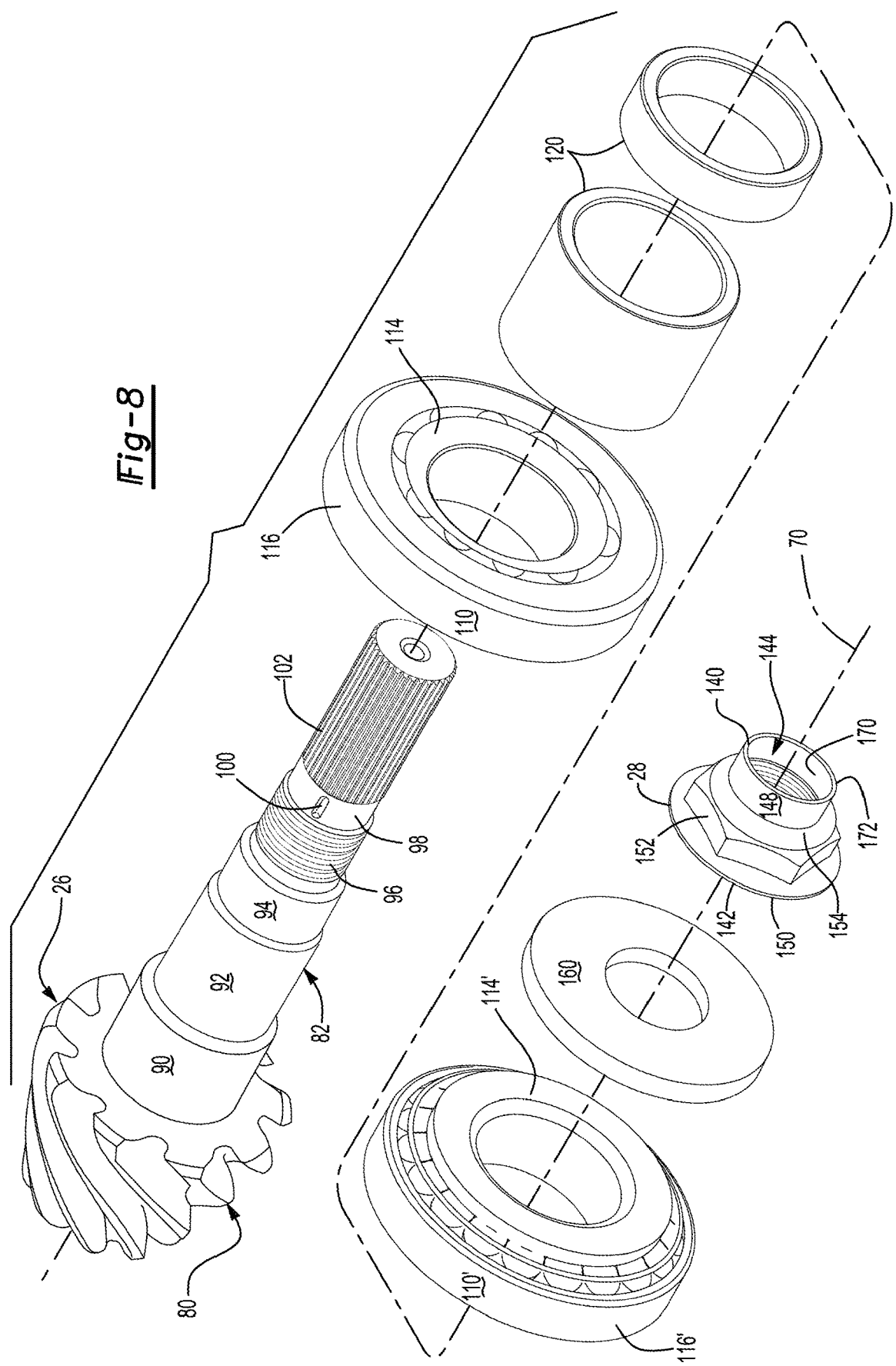

AXLE ASSEMBLY HAVING A DRIVE PINION AND A PRELOAD NUT AND A METHOD OF ASSEMBLY

TECHNICAL FIELD

This disclosure relates to an axle assembly having a drive pinion and a preload nut and a method of assembly.

BACKGROUND

An axle assembly having a drive pinion and a bearing preload element is disclosed in U.S. Pat. No. 10,316,950.

SUMMARY

In at least one embodiment an axle assembly is provided. The axle assembly may include a drive pinion and a preload nut. The drive pinion may be rotatable about an axis and may include a shaft that extends from a gear. The shaft may have a threaded portion and a recess that is disposed proximate the threaded portion. The preload nut may have a thread that mates with the threaded portion and a deformable ring that is disposed proximate the threaded portion. The deformable ring may engage the shaft inside the recess to inhibit the preload nut from rotating about the axis with respect to the drive pinion.

In at least one embodiment a method of assembling an axle assembly is provided. The method may include threading a preload nut onto a threaded portion of a drive pinion such that a deformable ring of the preload nut is disposed outside and extends around at least a portion of a recess in the drive pinion. The deformable ring may be deformed into the recess and into engagement with the drive pinion in the recess to inhibit the preload nut from rotating with respect to the drive pinion.

BRIEF DESCRIPTION OF THE DRAWINGS

FIG. 8 is an exploded perspective view of the items shown in FIG. 3.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
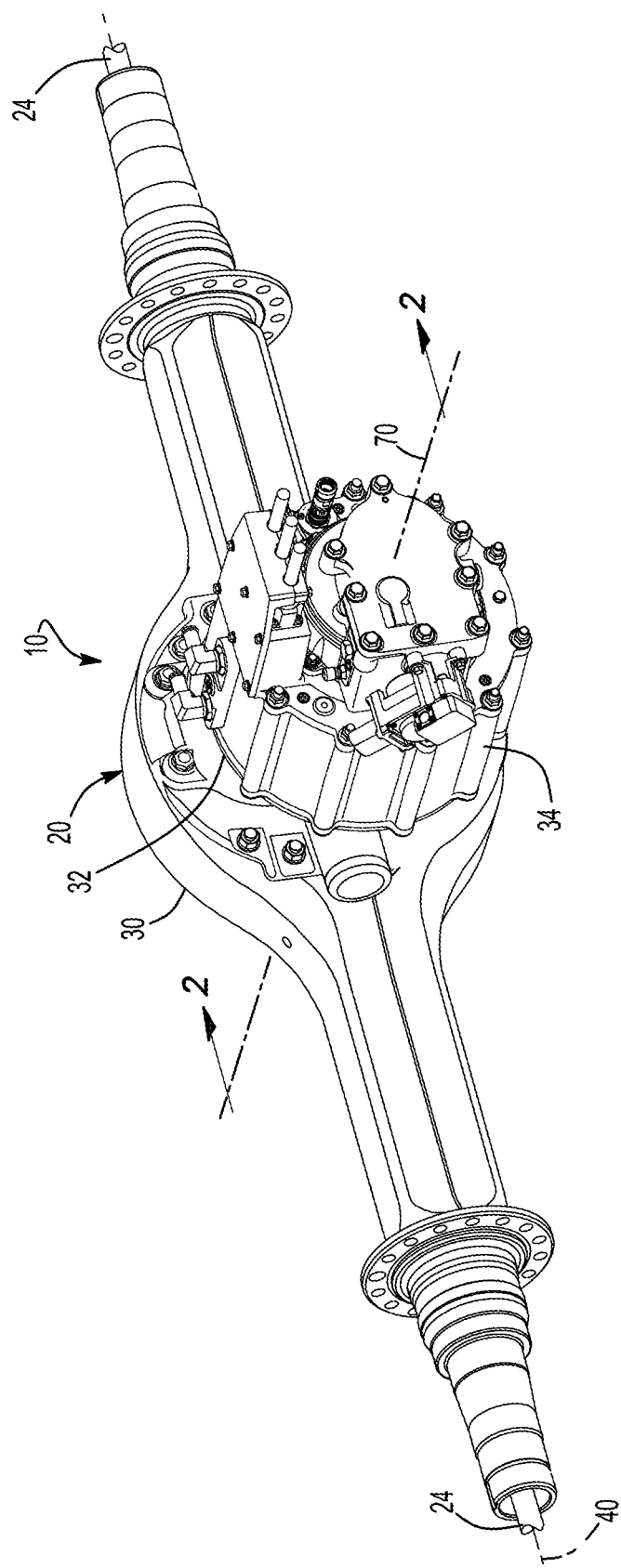
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

One or more axle assemblies may be provided with the vehicle. As is best shown with reference to FIGS. 1 and 2, the axle assembly 10 may include a housing assembly 20, a differential assembly 22, and at least one axle shaft 24. As is best shown in FIG. 2, the axle assembly 10 may also include a drive pinion 26 and a preload nut 28.

Figure 2:
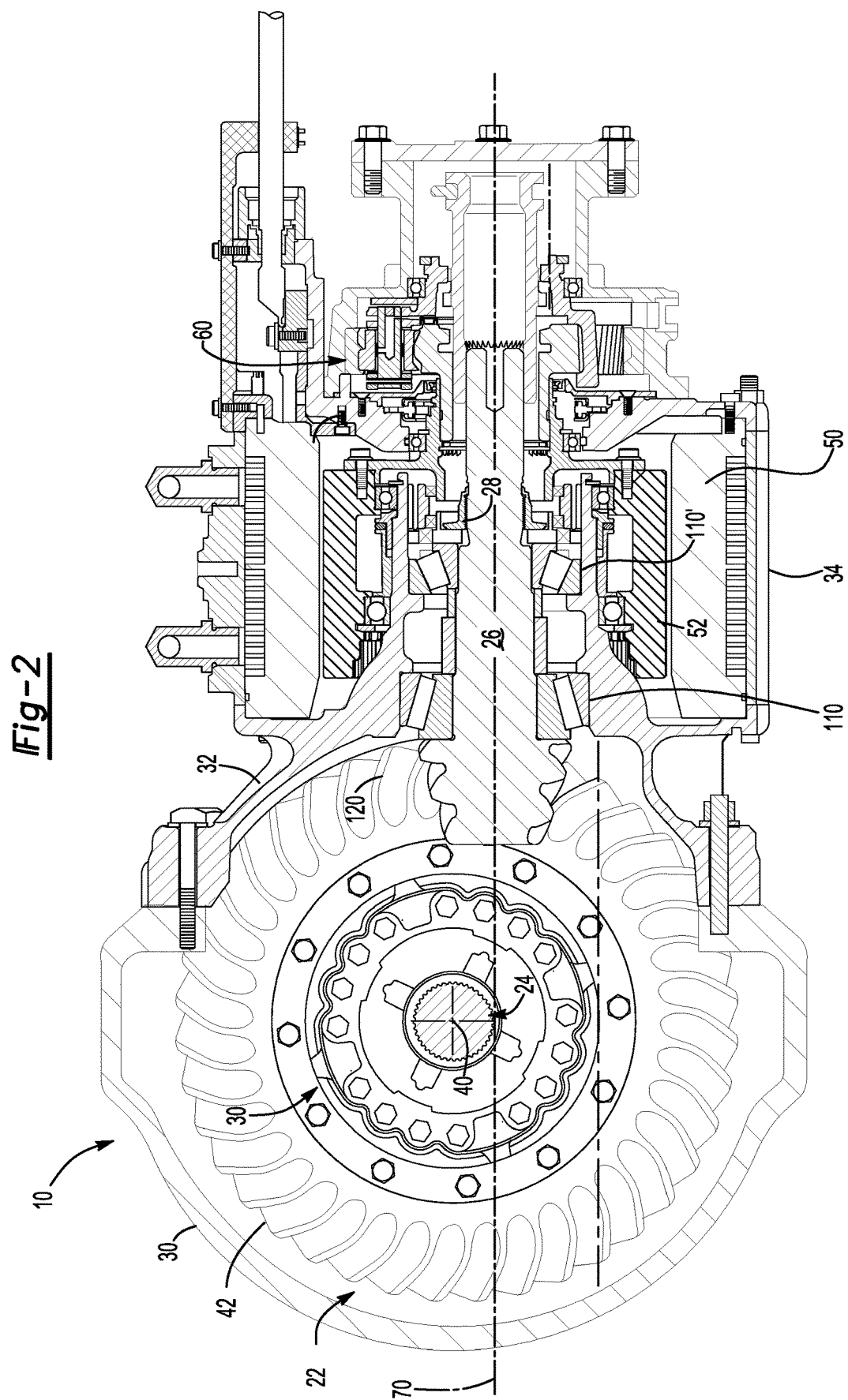
FIG. 2 is a section view of the axle assembly of FIG. 1 along section line 2-2.

Referring to FIGS. 1 and 2, the housing assembly 20 may receive various components of the axle assembly 10. In addition, the housing assembly 20 may facilitate mounting of the axle assembly 10 to the vehicle. For instance, the housing assembly 20 may include an axle housing 30, a differential carrier 32, and optionally an electric motor housing 34 if an electric motor is provided with the axle assembly 10.

Referring to FIG. 2, the axle housing 30 may at least partially receive the differential assembly 22. Optionally, the axle housing 30 may receive and support the axle shafts 24.

The differential carrier 32 may be mounted to the axle housing 30. The differential carrier 32 may support the differential assembly 22.

The differential assembly 22 may be at least partially received in the housing assembly 20. The differential assembly 22 may be rotatable about a differential axis 40 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 42 that may have teeth the mate or mesh with the teeth of a gear of a drive pinion 26. Accordingly, the differential assembly 22 may receive torque from the drive pinion 26 via the ring gear 42 and transmit torque to the axle shafts 24.

Referring to FIGS. 1 and 2, the axle shafts 24 may transmit torque from the differential assembly 22 to corresponding wheel hubs and wheels. Two axle shafts 24 may be provided such that each axle shaft 24 extends through a different arm portion of the axle housing 30. The axle shafts 24 or a portion thereof may extend along and may be rotatable about an axis, such as the differential axis 40. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Referring to FIGS. 2 and 8, the drive pinion 26 may transmit torque between a power source or torque source and the differential assembly 22 via the ring gear 42. The power source may be of any suitable type. For instance, the power source may be an electrical power source or a non-electrical power source. An example of an electrical power source is an electrical machine like an electric motor. An example of a non-electrical power source is an internal combustion engine. In the configuration shown in FIG. 2, the power source is configured as an electric motor that is provided with the axle assembly 10; however, it is contemplated that the power source, whether electrical or non-electrical, may not be provided with the axle assembly 10. For instance, a power source may be located remotely from the axle assembly 10 and may be operatively connected to the axle assembly 10 via a linkage like a shaft. A power source that is configured as an electric motor may include a stator 50 and a rotor 52. In the configuration shown, the stator 50 is received inside the housing assembly 20 while the rotor 52 is received inside the stator 50. The rotor 52 may extend around and may be rotatable about an axis with respect to the stator 50. The rotor 52 may be operatively connected to the drive pinion 26 in any suitable manner, such as via a transmission or gear reduction module 60.

Figure 3:
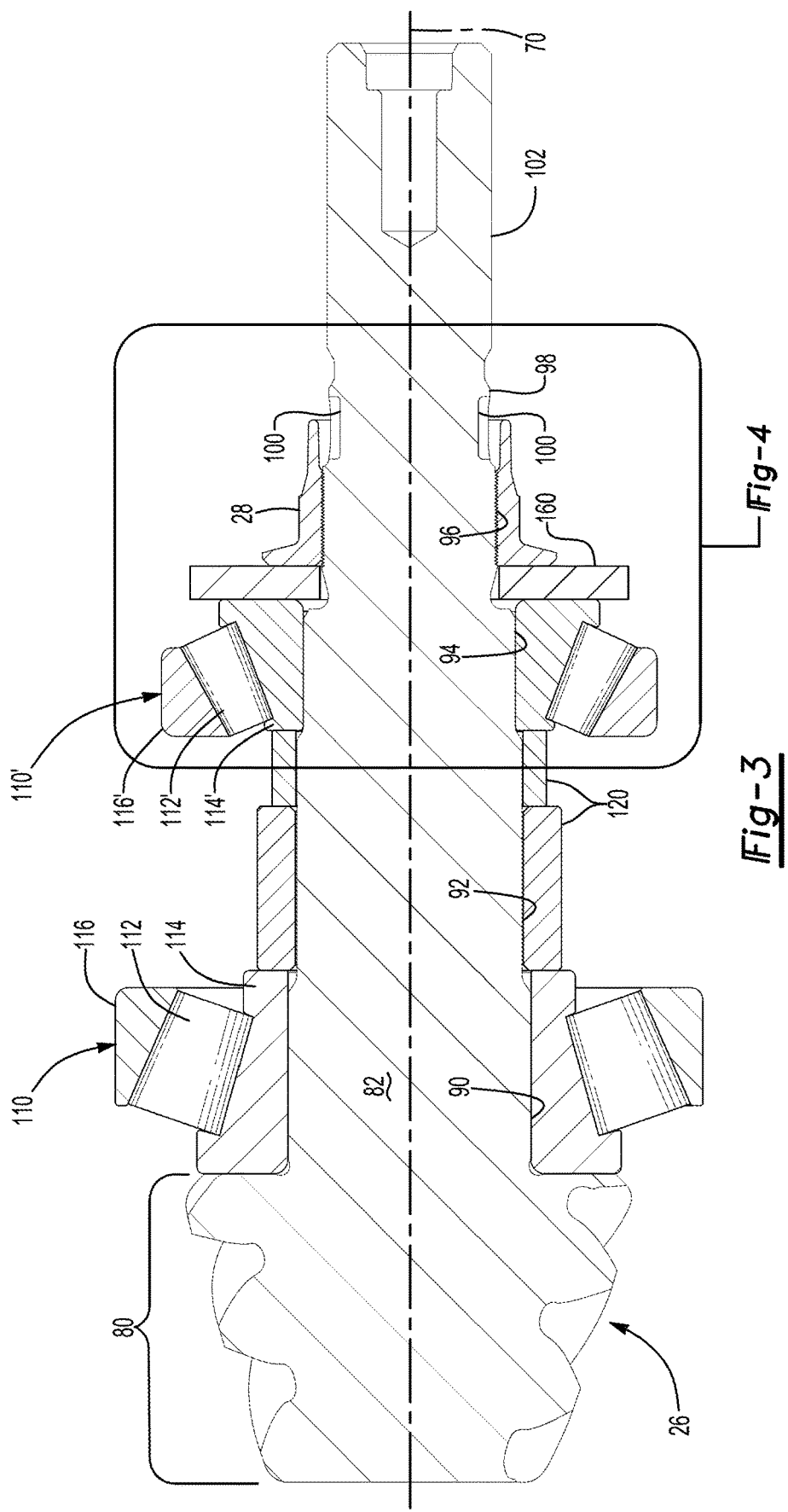
FIG. 3 is a magnified view of a portion of FIG. 2 that shows a drive pinion and a preload nut before the preload nut is fixed to a drive pinion.

Referring to FIGS. 2, 3 and 8, the drive pinion 26 may be rotatable about an axis 70, which may also be referred to as a drive pinion axis. The axis 70 may be disposed substantially perpendicular to the differential axis 40. In a configuration in which the axle assembly 10 includes an electric motor, the axis 70 may be the same as the axis about which the rotor 52 may rotate or may differ from the axis about which the rotor 52 may rotate.

The drive pinion 26 may extend along or around the axis 70. In at least one configuration, the drive pinion 26 may include a gear 80 and a shaft 82.

The gear 80 may be disposed at or near an end of the shaft 82. The gear 80 may have a plurality of teeth that may mate with corresponding teeth on the ring gear 42. The gear 80 may be integrally formed with the shaft 82 or may be provided as a separate component that may be fixedly disposed on the shaft 82.

The shaft 82 may extend from the gear 80. For instance, the shaft 82 may extend from the gear 80 in a direction that extends away from the differential assembly 22. In at least one configuration such as is best shown with reference to FIGS. 3 and 8, the shaft 82 may include a first outer surface 90, a second outer surface 92, a third outer surface 94, a threaded portion 96, a recess outer surface 98, one or more recesses 100, and a spline 102. Some of these features are optional as discussed below.

The first outer surface 90 may extend from the gear 80 and may be an outside circumference of a portion of the shaft 82. A first drive pinion bearing 110 may be disposed on the first outer surface 90 and may rotatably support the drive pinion 26. The first drive pinion bearing 110 may have any suitable configuration. For instance, the first drive pinion bearing 110 may be configured as a roller bearing assembly that may include a plurality of rolling elements 112 that may be disposed between an inner race 114 and an outer race 116. The inner race 114 may extend around and may be disposed on the first outer surface 90. The outer race 116 may extend around the rolling elements 112 and may be disposed on a supporting component, such as the differential carrier 32.

The second outer surface 92, if provided, may be positioned along the axis 70 or axially positioned between the first outer surface 90 and the third outer surface 94. The second outer surface 92 may be an outside circumference of a portion of the shaft 82 and may have a smaller diameter than the first outer surface 90. One or more spacers 120 may be disposed on the second outer surface 92. The spacers 120 may be configured as rings that may encircle the shaft 82 and may be axially positioned between the inner races 114, 114' of the drive pinion bearings 110, 110' to inhibit axial movement of the inner races 114, 114' toward each other.

The third outer surface 94, if provided, may be axially positioned between the second outer surface 92 and the threaded portion 96. The third outer surface 94 may be an outside circumference of a portion of the shaft 82 and may have a smaller diameter than the second outer surface 92. A second drive pinion bearing 110' may be disposed on the third outer surface 94 and may rotatably support the drive pinion 26. The second drive pinion bearing 110' may have any suitable configuration. For instance, the second drive pinion bearing 110' may be configured as a roller bearing assembly that may include a plurality of rolling elements 112' that may be disposed between an inner race 114' and an outer race 116'. The inner race 114' may extend around and may be disposed on the third outer surface 94. The outer race 116' may extend around the rolling elements 112', may be disposed on a supporting component, such as the differential carrier 32. In at least one configuration, the inner race 114' of the second drive pinion bearing 110' may have a smaller inside diameter than the inner race 114 of the first drive pinion bearing 110, the outer race 116' of the second drive pinion bearing 110' may have a smaller outside diameter than the outer race 116 of the first drive pinion bearing 110, or both.

It is noted that the second outer surface 92, the third outer surface 94, or both may be omitted. For instance, the axial length of the first outer surface 90 may be increased and the second drive pinion bearing 110', the spacers 120, or both may be disposed on the first outer surface 90.

Figure 4:
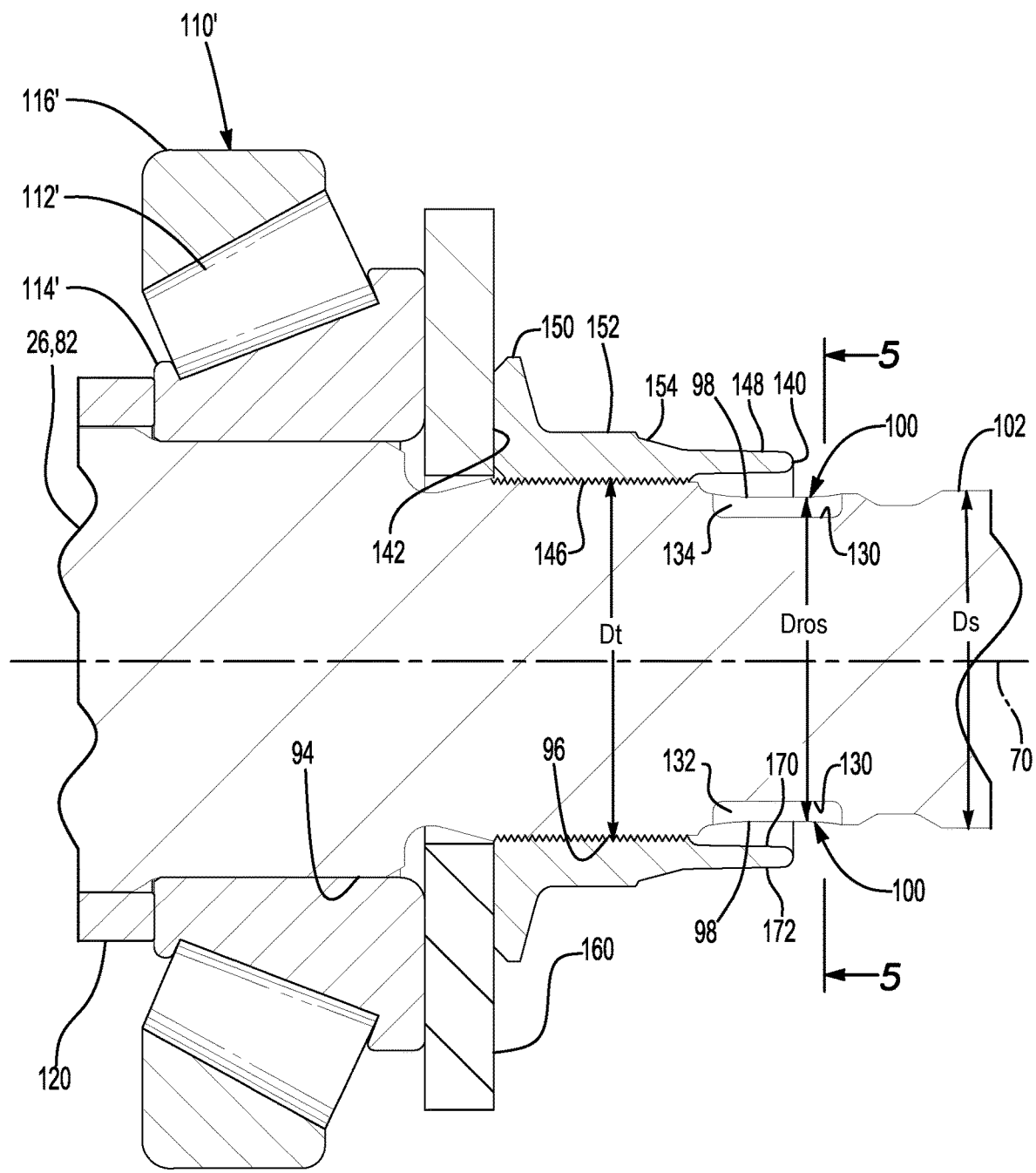
FIG. 4 is a magnified view of a portion of FIG. 3.

Referring to FIGS. 3, 4 and 8, the threaded portion 96 may be axially positioned between the third outer surface 94 and the spline 102. The threaded portion 96 may facilitate installation of the preload nut 28. For instance, the threaded portion 96 may include a thread that may mate or mesh with a corresponding thread on the preload nut 28. In at least one configuration, the threaded portion 96 may have an outside diameter Dt that may be smaller than the diameter of the first outer surface 90, the second outer surface 92, the third outer surface 94, or combinations thereof.

The recess outer surface 98 may be axially positioned between the gear 80 and a distal end of the shaft 82 that may be disposed opposite the gear 80. For instance, the recess outer surface 98 may be axially positioned between the threaded portion 96 and the spline 102 and may extend between the threaded portion 96 and the spline 102. The recess outer surface 98 may be an outside circumference of a portion of the shaft 82 and may have a smaller diameter than the first outer surface 90, the second outer surface 92, third outer surface 94, the threaded portion 96, or combinations thereof.

One or more recesses 100 may be provided with the recess outer surface 98. In the configuration shown, two recesses 100 are illustrated; however, it is contemplated that a greater or lesser number of recesses 100 may be provided. A recess 100 may be disposed proximate the threaded portion 96 and may be axially positioned further from the gear 80 than the threaded portion 96 is positioned from the gear 80. For instance, a recess 100 may be axially positioned between the threaded portion 96 and the spline 102. In at least one configuration, the recess 100 may extend past an end of the preload nut 28 as is best shown in FIG. 4, in which case the recess 100 may be disposed closer to the spline 102 than the preload nut 28 is disposed to the spline 102.

Figure 5:
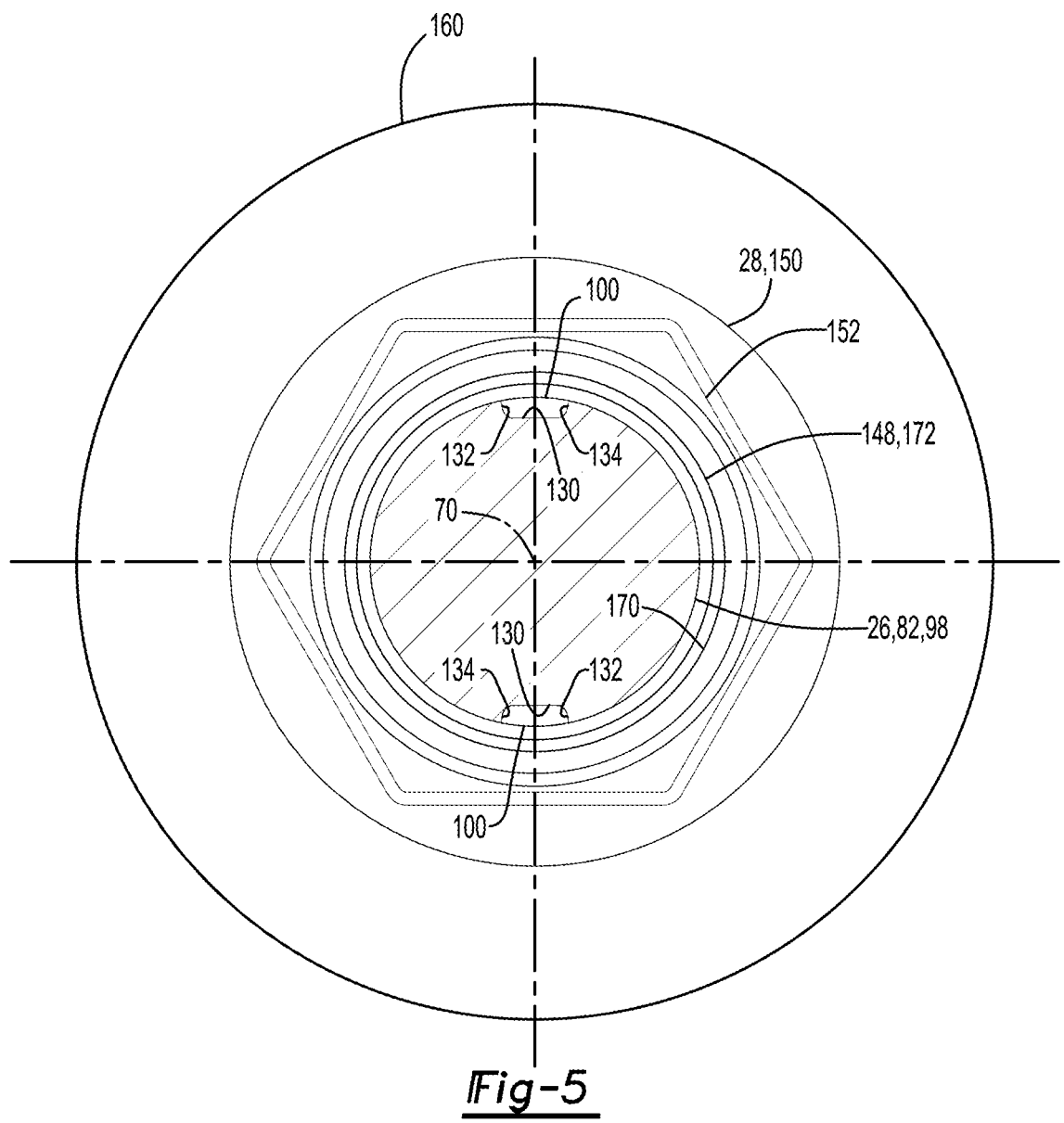
FIG. 5 is a section view along section line 5-5 without bearing assemblies that support the drive pinion.

A recess 100 may extend from the recess outer surface 98 toward the axis 70 and may have any suitable configuration. For instance, a recess 100 may be configured as a blind hole or a through hole. In addition, a recess 100 may have any suitable shape. In the configuration shown, each recess 100 is depicted as being an elongated slot that has a generally oval-shaped configuration in which the length of the recess 100 in an axial direction is greater than its width in a circumferential direction. For example, the axial length of the recess 100 may be at least twice its width. It is also contemplated that a recess 100 may be provided with other shapes and may also have an axial length that is less than its width. For instance, a recess 100 may be configured as a groove that may extend continuously around the axis 70. In at least one configuration, the recess 100 may be at least partially defined by a recess bottom surface 130, a first lateral side 132, and a second lateral side 134, which are best shown with reference to FIGS. 4 and 5.

The recess bottom surface 130 may be disposed at a bottom of the recess 100. As such, the recess bottom surface 130 may be disposed closer to the axis 70 than the recess outer surface 98.

The first lateral side 132 may extend between the recess outer surface 98 and the recess bottom surface 130. For instance, the first lateral side 132 may extend from the recess outer surface 98 to a first end or first edge of the recess bottom surface 130.

The second lateral side 134 may be disposed opposite the first lateral side 132. The second lateral side 134 may extend between the recess outer surface 98 and the recess bottom surface 130. For instance, the second lateral side 134 may extend from the recess outer surface 98 to a second end or second edge of the recess bottom surface 130.

Referring to FIGS. 3 and 8, the spline 102, if provided, may be disposed between the threaded portion 96 and the distal end of the shaft 82. The spline 102 may include a plurality of teeth. In at least one configuration, the teeth of the spline 102 may be disposed substantially parallel to the axis 70 and may mate with a corresponding spline of another component, such as a coupling or shift collar that may operatively connect the drive pinion 26 to the power source. The spline 102 may have an outside diameter Ds that may be larger than the diameter Dros of the recess outer surface 98. It is also contemplated that the spline 102 may be omitted and that the drive pinion 26 may be coupled to another component in a different manner, such as with a fastener, and that the recess outer surface 98 may be disposed proximate or may extend from an end of the shaft 82.

Referring to FIGS. 4 and 8, the preload nut 28 may be mountable to the drive pinion 26. In at least one configuration, the preload nut 28 may include a first end 140, a second end 142, a hole 144, a thread 146, and a deformable ring 148. The preload nut 28 may optionally include a flange 150, a tool engagement portion 152, a transition region 154, or combinations thereof.

The first end 140 may face away from the gear 80 and the first and second drive pinion bearings 110, 110' when the preload nut 28 is installed on the drive pinion 26.

The second end 142 may be disposed opposite the first end 140. The second end 142 may face toward the gear 80 and the first and second drive pinion bearings 110, 110' when the preload nut 28 is installed on the drive pinion 26. For instance, the second end 142 may face toward and may engage or contact a washer 160 that may be axially positioned between the second drive pinion bearing 110' and the preload nut 28.

The hole 144 may be a through hole that may extend from the first end 140 to the second end 142. The shaft 82 of the drive pinion 26 may be received in and may extend through the hole 144.

The thread 146 may be disposed in the hole 144. The thread 146 may mate with the threaded portion 96 of the drive pinion 26 to help secure the preload nut 28 to the drive pinion 26. In at least one configuration, the thread 146 may generally extend from the first end 140 toward the second end 142. The thread 146 may not be provided with the deformable ring 148.

The deformable ring 148 may extend from the first end 140 toward the second end 142. For instance, the deformable ring 148 may extend from the first end 140 to the thread 146. As such, the deformable ring 148 may be disposed proximate the thread 146, the threaded portion 96, or both. In at least one configuration, the deformable ring 148 may extend continuously around the axis 70; however, it is contemplated that the deformable ring 148 may be discontinuous. The deformable ring 148 may be deformable to engage the shaft 82 inside a recess 100 to inhibit rotation of the preload nut 28 about the axis 70 with respect to the drive pinion 26 as will be discussed in more detail below. The deformable ring 148 may be at least partially defined by an interior side 170 and an exterior side 172.

The interior side 170 may face toward the shaft 82 of the drive pinion 26. For example, the interior side 170 may face toward the recess outer surface 98. At least a portion of the interior side 170 may face toward and may overlap a recess 100. The interior side 170 may be spaced apart from the recess outer surface 98 prior to deformation or engagement with the drive pinion 26 as will be discussed in more detail below.

The exterior side 172 may be disposed opposite the interior side 170. In at least one configuration, the wall thickness of the deformable ring 148 in a radial direction from the interior side 170 to the exterior side 172 may be less than the wall thickness of the flange 150, the tool engagement portion 152, the transition region 154, or combinations thereof.

The flange 150 may be disposed at the second end 142 and may extend from the second end 142 of the preload nut 28. As such, the flange 150 may engage or contact the washer 160 or the inner race 114' of the second drive pinion bearing 110' if the washer 160 is omitted. The flange 150 may extend further from the axis 70 or may have a larger diameter than the tool engagement portion 152.

The tool engagement portion 152 may be axially positioned between the flange 150 and the deformable ring 148. For instance, the tool engagement portion 152 may extend from the flange 150 to the transition region 154. In at least one configuration, the tool engagement portion 152 may include a plurality of intersecting flat surfaces that may be grasped by a tool, such as a wrench or socket, to facilitate tightening and loosening of the preload nut 28. In at least one configuration, the tool engagement portion 152 may extend further from the axis 70 than the deformable ring 148 and the transition region 154.

The transition region 154 may extend axially between the tool engagement portion 152 and the deformable ring 148. In at least one configuration, the transition region 154 may be tapered such that the diameter of the transition region 154 becomes progressively smaller in an axial direction that extends from the tool engagement portion 152 to the deformable ring 148. As such, the transition region 154 may extend further from the axis 70 than the deformable ring 148.

Referring to FIGS. 2-7, a method of assembly will now be discussed.

First, the drive pinion 26, first and second drive pinion bearings 110, 110', and spacers 120 may be assembled, which may result in positioning of these components as is shown in FIGS. 2 and 3. Assembly of these components may occur in any appropriate sequence. For instance, the first drive pinion bearing 110, the second drive pinion bearing 110', or both may be installed on a supporting component, such as the differential carrier 32, prior to inserting the drive pinion 26 into a drive pinion bearing. Alternatively, the first drive pinion bearing 110, second drive pinion bearing 110', spacers 120, or combinations thereof may be installed on the shaft 82 of the drive pinion 26 before installation on the supporting component. As a nonlimiting example, the first drive pinion bearing 110 may be mounted to the differential carrier 32, the shaft 82 of the drive pinion 26 may be inserted through the hole in the inner race 114 of the first drive pinion bearing 110, the spacers 120 may be slid onto the shaft 82, and then the second drive pinion bearing 110' may be slid onto the shaft 82 and into engagement with the differential carrier 32 such that the spacers 120 may be axially positioned between the inner race 114 of the first drive pinion bearing 110 and the inner race 114' of the second drive pinion bearing 110'.

Next, the washer 160 may be slid onto the shaft 82 and into engagement with the second drive pinion bearing 110'.

Next, the preload nut 28 may be installed on the shaft 82. The preload nut 28 may be installed by engaging or mating the thread 146 of the preload nut 28 with the threaded portion 96 of the drive pinion 26 and rotating the preload nut 28 in a first rotational direction about the axis 70. The preload nut 28 may be rotated to advance the preload nut 28 in an axial direction toward the gear 80 and may be rotated and tightened until the preload nut 28 exerts a desired preload force against the first drive pinion bearing 110, the second drive pinion bearing 110', or both. At this point, the positioning of the preload nut 28 may resemble that shown in FIGS. 2-5, with the deformable ring 148 of the preload nut 28 extending around at least a portion of the recess 100, disposed outside of the recess 100, and spaced apart from the drive pinion 26.

Next, the deformable ring 148 may be deformed into the recess 100 and into engagement with the drive pinion 26 to inhibit the preload nut 28 from rotating with respect to the drive pinion 26. This is best shown with reference to FIGS. 6 and 7. For instance, a tool having one or more engagement features 180, which are shown in FIG. 7, may engage the exterior side 172 of the deformable ring 148. An engagement feature 180 may be actuated to exert a compressive force against the exterior side 172 of the deformable ring 148 that may be sufficient to compress and form at least a portion of the deformable ring 148 into the recess 100. An engagement feature 180 may have any suitable configuration. For example, an engagement feature 180 may be configured as a punch or crimp head and may optionally have a tip that may be sized slightly smaller than the recess 100. In the configuration shown in FIG. 7, two engagement features 180 are illustrated that are disposed directly opposite each other and are aligned with corresponding recesses 100 in the drive pinion 26. The engagement features 180 may be actuated at the same time to compress the deformable ring 148 into each recess 100.

Figure 6:
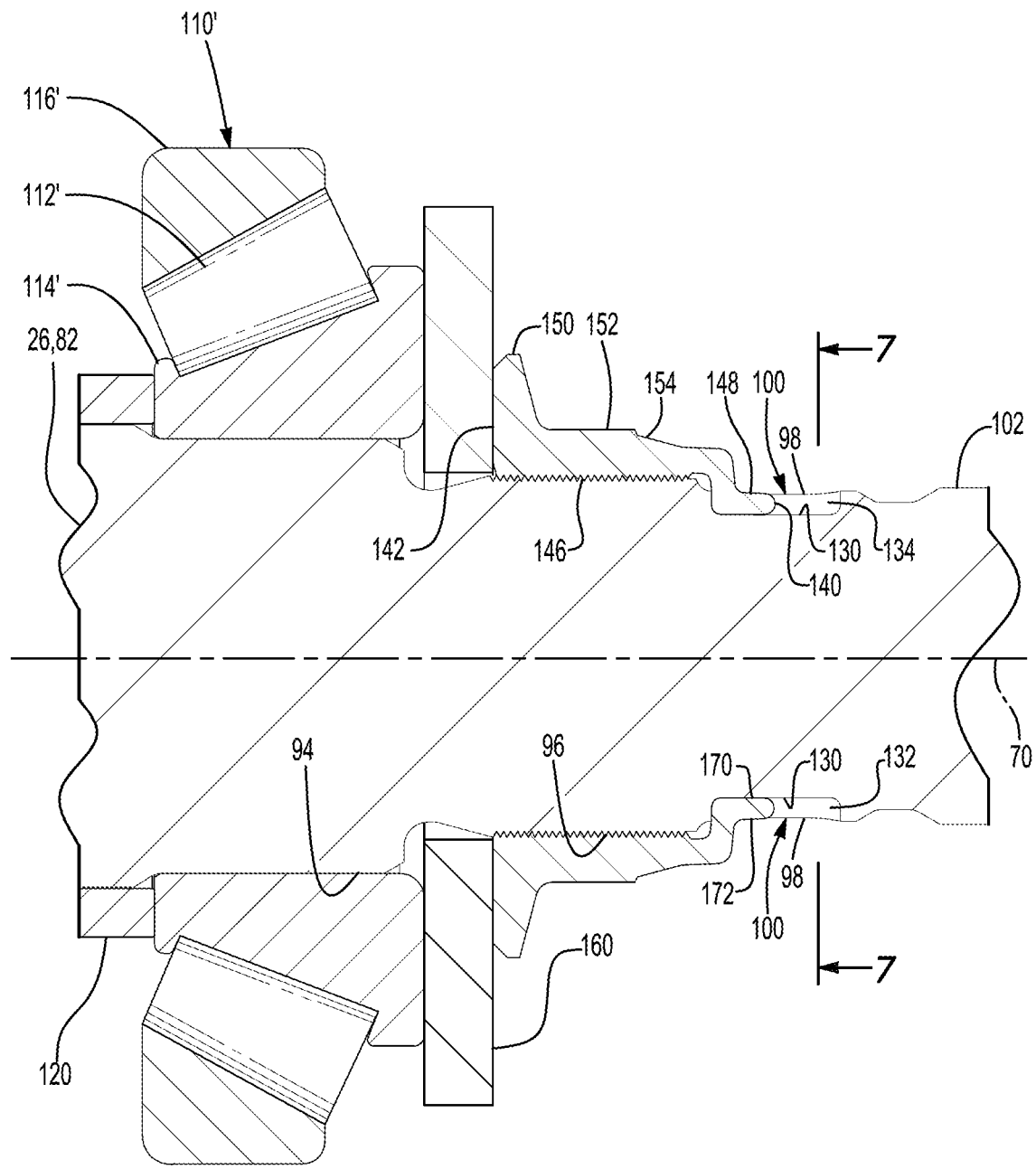
FIG. 6 is a magnified view that shows the preload nut fixed to the drive pinion.
Figure 7:
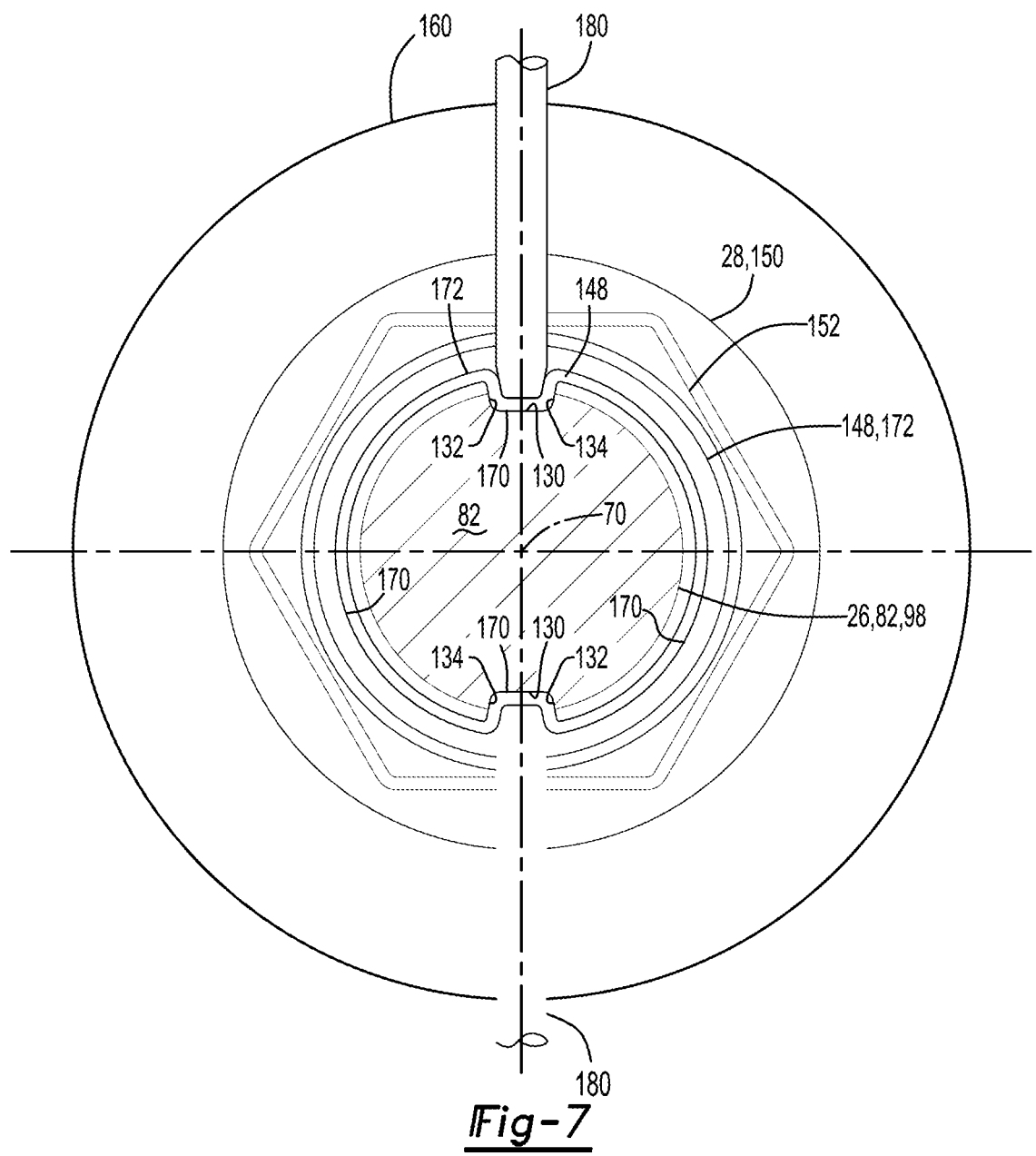
FIG. 7 is a section view along section line 7-7 and additionally examples of engagement features fixing the preload nut to the drive pinion.

Referring to FIG. 6, a portion of the first end 140 of the preload nut 28 may be received in the recess 100 after the deformable ring 148 is deformed. Alternatively, the first end 140 of the preload nut 28 may not be received in the recess 100 if the deformable ring 148 has a sufficient axial length to extend past the end of the recess 100 that is disposed closest to the spline 102. In such a configuration, a portion of the deformable ring 148 that is disposed between the first end 140 and the thread 146 may be deformed into the recess 100 by an engagement feature 180.

Referring to FIGS. 6 and 7, the deformable ring 148 may engage or contact various surfaces that may define the recess 100 after deformation. For instance, the deformable ring 148 may engage or contact the recess bottom surface 130, the first lateral side 132, the second lateral side 134, or combinations thereof. The deformable ring 148 need not engage the recess bottom surface 130, both lateral sides, or the axial ends or left and right ends of the recess 100 from the perspective shown in FIG. 6. However, engaging the deformable ring 148 with the first lateral side 132 and the second lateral side 134 may inhibit rotation of the preload nut 28 in first and second rotational directions about the axis 70 with respect to the drive pinion 26 and thereby inhibit tightening or loosening of the preload nut 28.

Referring to FIG. 7, in a configuration having multiple recesses 100, the interior side 170 of the deformable ring 148 may be at least partially spaced apart from the recess outer surface 98 of the shaft 82 after the deformable ring 148 has been compressed or deformed. For instance, the interior side 170 may be at least partially spaced apart from the recess outer surface 98 between adjacent recesses 100, such as to the left and right of the recesses 100 from the perspective shown. It is also contemplated that the interior side 170 may engage the recess outer surface 98 continuously around the axis 70 once the deformable ring 148 has been compressed or deformed.

The engagement feature 180 may be disengaged from or retracted away from the deformable ring 148 after the deformable ring 148 has been deformed into the recess 100.

An axle assembly having a drive pinion and preload nut as described above may allow a preload nut to be installed and secured to prevent or inhibit rotation of the preload nut with respect to the drive pinion, which may allow a bearing preload force to be set and maintained. Maintaining a desired preload force may prevent skidding of a bearing assembly, reduce friction and heating of the bearing, and help improve bearing life, thereby reducing maintenance costs. Moreover, the preload nut may be installed without the use of additional locking devices or components, such as mechanical locking devices like nylon nuts, split washers, or adhesives like a thread locking fluid, which may help reduce costs and assembly time. Moreover, the deformable portion of the preload nut may be mechanically separable or disengageable from the drive pinion in the event that removal of the preload nut from the drive pinion is subsequently desired. For instance, the deformable portion of the preload nut that is received in a recess may be pushed out of the recess or severed from the preload nut to permit the preload nut to be easily unthreaded from the drive pinion without damaging the threads of the drive pinion, which may allow the drive pinion to be removed from the axle assembly and subsequently reused, thereby reducing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. An axle assembly comprising:
   a drive pinion that is rotatable about an axis, the drive pinion including:
      a gear; and a shaft that extends from the gear, the shaft having a threaded portion and a recess that is disposed proximate the threaded portion; and a preload nut that has a thread that mates with the threaded portion and a deformable ring that is disposed proximate the threaded portion, wherein the deformable ring engages the shaft inside the recess to inhibit the preload nut from rotating about the axis with respect to the drive pinion, wherein the shaft includes a spline and the recess is axially positioned between and spaced apart from the threaded portion and the spline such that the recess does not extend from the spline.

2. The axle assembly of claim 1 wherein the recess is axially positioned further from the gear than the threaded portion is positioned from the gear.

3. The axle assembly of claim 1 wherein the spline is disposed closer to the recess than to the preload nut.

4. The axle assembly of claim 1 wherein the shaft has a recess outer surface that extends between the threaded portion and the spline, wherein the recess extends from the recess outer surface toward the axis.

5. The axle assembly of claim 4 wherein the recess is at least partially defined by a recess bottom surface and a first lateral side that extends between the recess outer surface and the recess bottom surface, wherein the deformable ring engages the first lateral side.

6. The axle assembly of claim 5 wherein the recess is at least partially defined by a second lateral side that is disposed opposite the first lateral side and extends between the recess outer surface and the recess bottom surface, wherein the deformable ring engages the second lateral side.

7. The axle assembly of claim 4 wherein the spline has an outside diameter that is larger than a diameter of the recess outer surface and the recess outer surface has a smaller diameter than a diameter of the threaded portion.

8. The axle assembly of claim 1 wherein the preload nut has a first end from which the deformable ring extends and a portion of the first end is received in the recess.

9. The axle assembly of claim 1 wherein the deformable ring extends continuously around the axis.

10. The axle assembly of claim 1 wherein the shaft has a recess outer surface from which the recess extends, and the deformable ring has an interior side that faces toward the recess outer surface, wherein at least a portion of the interior side is spaced apart from the recess outer surface.

11. The axle assembly of claim 1 wherein the shaft has a second recess that is spaced apart from the recess, and a recess outer surface from which the recess and the second recess extend toward the axis, and the deformable ring has an interior side that faces toward the recess outer surface, wherein the interior side is at least partially spaced apart from the recess outer surface between the recess and the second recess.

12. The axle assembly of claim 1 wherein the deformable ring extends from a first end of the preload nut, a flange is disposed at a second end of the preload nut, and a tool engagement portion is axially positioned between the flange and the deformable ring, wherein the flange extends further from the axis than the tool engagement portion and the tool engagement portion extends further from the axis than the deformable ring.

13. The axle assembly of claim 12 wherein the preload nut has a transition region that extends axially between the tool engagement portion and the deformable ring, wherein the tool engagement portion extends further from the axis than the transition region and the transition region extends further from the axis than the deformable ring.

14. The axle assembly of claim 1 wherein the preload nut does not contact the spline.

15. The axle assembly of claim 1 wherein the deformable ring does not contact the spline.

16. An axle assembly comprising:
a drive pinion that is rotatable about an axis, the drive pinion including:
a gear; and
a shaft that extends from the gear, the shaft having a threaded portion, a spline, a recess that is disposed proximate the threaded portion and that is axially positioned between the threaded portion and the spline, and a recess outer surface that extends between the threaded portion and the spline; and a preload nut that has a thread that mates with the threaded portion and a deformable ring that is disposed proximate the threaded portion, wherein the deformable ring engages the shaft inside the recess to inhibit the preload nut from rotating about the axis with respect to the drive pinion, wherein the recess extends from the recess outer surface toward the axis, wherein the spline has an outside diameter that is larger than a diameter of the recess outer surface and the recess outer surface has a smaller diameter than a diameter of the threaded portion.

17. A method of assembling an axle assembly comprising:
threading a preload nut onto a threaded portion of a drive pinion such that a deformable ring of the preload nut is disposed outside and extends around at least a portion of a recess in the drive pinion; and
deforming the deformable ring into the recess and into engagement with the drive pinion in the recess to inhibit the preload nut from rotating with respect to the drive pinion, wherein the drive pinion has a shaft that includes a spline and the recess is axially positioned between and spaced apart from the threaded portion and the spline such that the recess does not extend from the spline.

18. The method of claim 17 wherein threading the preload nut onto the threaded portion of the drive pinion includes tightening the preload nut to exert a preload force on a roller bearing assembly that rotatably supports the drive pinion, and deforming the deformable ring secures the preload nut to maintain the preload force.

19. The method of claim 17 wherein the deformable ring is spaced apart from the drive pinion before deforming and the deformable ring contacts the drive pinion in the recess after deforming.

20. The method of claim 17 wherein the recess is at least partially defined by a recess bottom surface, a first lateral side that extends from the recess bottom surface, and a second lateral side that is disposed opposite the first lateral side and extends from the recess bottom surface, and deforming the deformable ring engages the deformable ring against the first lateral side and the second lateral side.

21. The method of claim 17 wherein the deformable ring is deformed with a first engagement feature that compresses the deformable ring into the recess.

22. The method of claim 21 wherein the deformable ring is deformed with a second engagement feature that compresses the deformable ring into a second recess in the drive pinion at the same time the first engagement feature compresses the deformable ring into the recess.

23. The method of claim 17 wherein the preload nut does not contact the spline when the deformable ring is deformed into the recess.

24. The method of claim 17 wherein the deformable ring does not contact the spline.

* * * * *